United States Patent
Moulene et al.

(10) Patent No.: US 8,818,700 B2
(45) Date of Patent: Aug. 26, 2014

(54) MOTORISED VEHICLE WITH CONTROLLED INCLINATION

(71) Applicants: Daniel Moulene, Villennes sur Seine (FR); Thierry Moulene, Courbevoie (FR)

(72) Inventors: Daniel Moulene, Villennes sur Seine (FR); Thierry Moulene, Courbevoie (FR)

(*) Notice: Subject to any disclaimer, the term of this patent is extended or adjusted under 35 U.S.C. 154(b) by 0 days.

(21) Appl. No.: 14/188,016

(22) Filed: Feb. 24, 2014

(65) Prior Publication Data
US 2014/0172286 A1    Jun. 19, 2014

Related U.S. Application Data

(63) Continuation-in-part of application No. 12/918,409, filed as application No. PCT/IB2009/000400 on Mar. 2, 2009.

(30) Foreign Application Priority Data

Feb. 29, 2008  (FR) ..................................... 08 01139

(51) Int. Cl.
   *G06F 17/10*  (2006.01)
(52) U.S. Cl.
   USPC ................. 701/124; 701/22; 701/36; 701/41; 701/42; 280/5.509; 280/124.103; 280/5.507; 280/5.508; 280/6.154; 180/199; 180/210; 180/405; 180/41
(58) Field of Classification Search
   CPC ............. B60G 21/007; B60G 2300/13; B60G 2300/45; B60G 17/0162; B60G 21/05; B60G 2200/144; B60G 2200/44; B60G 2200/46; B60G 2200/462; B60G 2200/464; B60G 2202/413; B60G 2204/143; B60G 2204/421
   See application file for complete search history.

(56) References Cited

U.S. PATENT DOCUMENTS

| | | | |
|---|---|---|---|
| 4,546,997 A | 10/1985 | Smyers | |
| 5,437,467 A | 8/1995 | Patin | |
| 5,927,424 A * | 7/1999 | Van Den Brink et al. | 180/216 |
| 6,511,078 B2 | 1/2003 | Sebe | |
| 6,817,617 B2 | 11/2004 | Hayashi | |
| 7,407,173 B2 | 8/2008 | Walker | |
| 7,526,372 B2 * | 4/2009 | Tsutsumi et al. | 701/43 |
| 7,607,695 B2 * | 10/2009 | Moulene et al. | 280/775 |
| 2003/0155163 A1 * | 8/2003 | Sugata et al. | 180/199 |
| 2004/0051260 A1 | 3/2004 | Oldiges | |
| 2007/0193803 A1 * | 8/2007 | Geiser | 180/215 |
| 2008/0197597 A1 * | 8/2008 | Moulene et al. | 280/124.103 |
| 2008/0227365 A1 * | 9/2008 | Lo | 446/440 |

FOREIGN PATENT DOCUMENTS

FR          2 872 773 A       1/2006

OTHER PUBLICATIONS

International Search Report mailed Jun. 19, 2009 in counterpart International Patent Application No. PCT/IB2009/000400.

* cited by examiner

Primary Examiner — Redhwan K Mawari
(74) Attorney, Agent, or Firm — Oliff PLC

(57) ABSTRACT

The motor vehicle of the invention is provided with at least three wheels and includes a driving cab capable of accommodating a single person in the width direction. The motor vehicle comprises a bend-balancing means that acts by the inclination of at least the portion of the chassis that bears the driving cab. According to the invention, the vehicle is also provided with speed, acceleration and/or inclination sensors, and the balancing means are automatically controlled when the information supplied by the sensors is lower than a main predetermined threshold. The invention also provides that the automatic control of the balancing means is deactivated when the information provided by the sensors is higher than said main threshold.

7 Claims, 2 Drawing Sheets

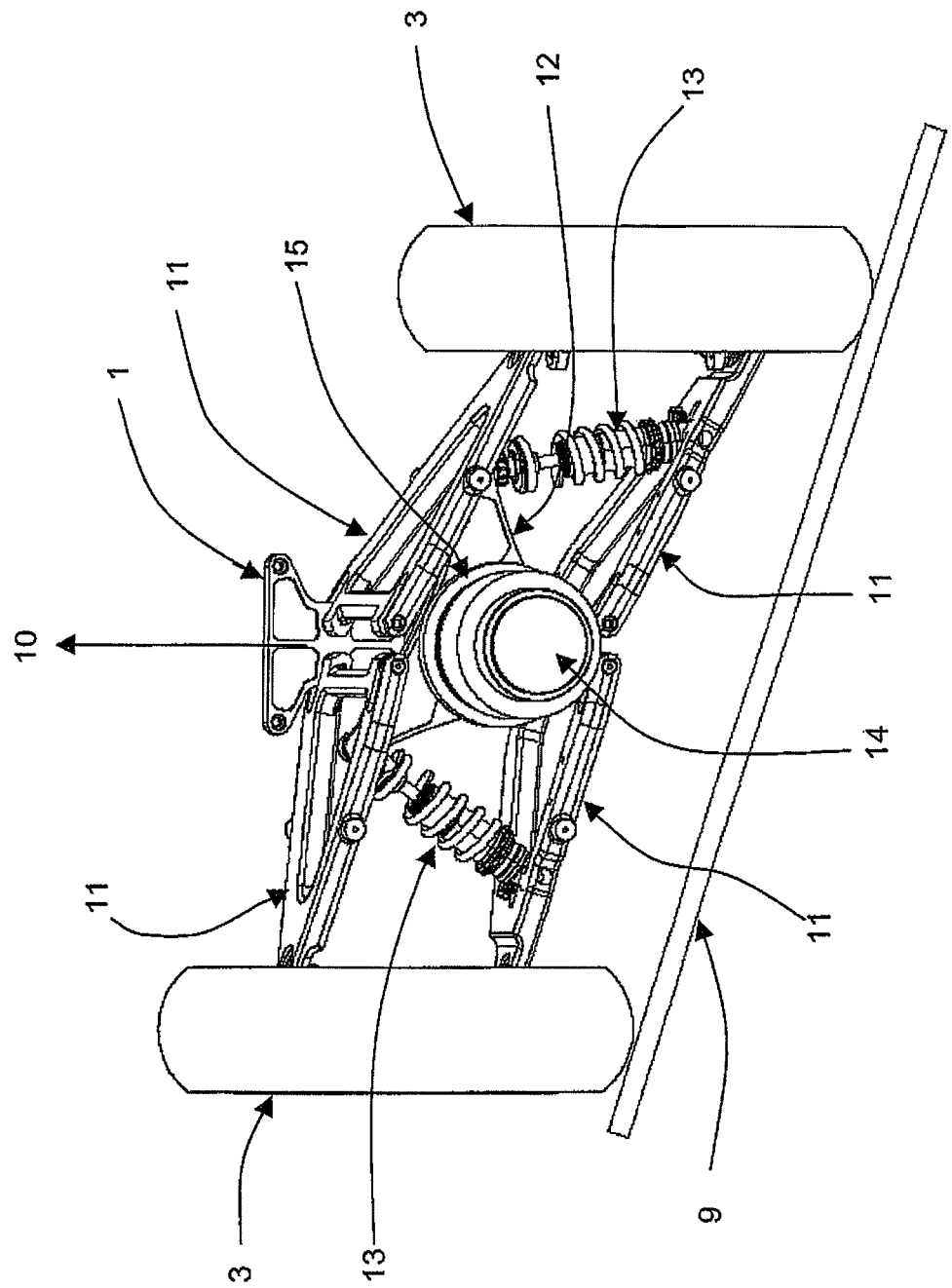

MOTORISED VEHICLE WITH CONTROLLED INCLINATION

This is a Continuation-in-Part of application Ser. No. 12/918,409 filed Aug. 19, 2010, which in turn is a National Phase of Application No. PCT/IB2009/000400 filed Mar. 2, 2009, which claims priority to French patent application Ser. No. 08/01139 filed Feb. 29, 2008. The disclosure of the prior applications is hereby incorporated by reference herein in its entirety.

TECHNICAL FIELD

The present invention relates to light motorised vehicles, preferably those having more than two wheels. It applies with advantage for example to scooters, motocycles, or other narrow vehicles having dimensions such that they can accommodate only a single person in the width direction. This type of vehicle takes up less space than a classic four-wheels car when it is parked. It can travel more easily in traffic, in particular in urban traffic and it takes up less space on the road.

BACKGROUND

Some of those vehicles comprise balancing means for keeping in equilibrium a vehicle which is running along bends or on a road inclined relative to the horizontal. These balancing means act in particular by inclination of the vehicle chassis, sometimes involving in addition a simultaneous inclination of all or some of the vehicle wheels. Known vehicles currently use such balancing means that are embodied in a manual version, wherein it is the vehicle driver (driving person) who controls the balancing means. Such is the case of the motorized tricycles like Piaggio MP3, Quadro 350, Peugeot Metroplis or Vectrix VX3.

In such vehicles the driver has himself the burden to ensure the equilibrium of the vehicle. This is not too difficult generally, but when the vehicle is running at low speed, and when its stops, it is more difficult. That solution is not convenient if the vehicle is too heavy.

At the end of stopping, if the vehicle is not stable the driver can bring it back in an upright position by putting his feet on the ground. This solution is not convenient for a closed vehicle.

To make the vehicle stable at stop, all of the above vehicles have a manual button to block the vehicle in the position it has at the moment. An automatic blocking device is never provided. This is because the vehicle could be in a non vertical position at stopping if the driver has not made it correctly. It is the reason why the driver keeps the vehicle in a vertical position, even with putting his feet on the ground, before pushing the blocking button.

Moulene and al U.S. Pat. No. 7,607,695 proposes a four wheels vehicle with balancing means. These balancing means can be controlled manually or automatically. With the manual balancing system, the driver has the same problem as the above cited tricycles, i.e. in case the vehicle is not vertical when stopping. But it is proposed that the vehicle will have righting means to upright the vehicle before it can be closed and left.

With the automatic balancing means, the vehicle of Moulene and al does not show these problems. Some other vehicles are also completely equipped with automatic balancing means. The driver has not to take care about equilibrium of the vehicle, this is made automatically. It is a great advantage. The equilibrium is fully controlled exclusively by a dedicated automatic device which for example comprises an electric actuator or a hydraulic device.

But this fully automatic balancing means needs high power, needs a very accurate system to be safe particularly at high speed or in difficult cornering or in slalom. At the end, it is a very interesting solution but with a higher cost and in quite heavy vehicle. Consequently this automatic balancing means is limited to expensive vehicles.

In some other vehicles, it was also proposed to use two moving supports to stabilize the vehicle when stopping, but this needs to have a horizontal ground.

SUMMARY

The invention proposes an embodiment that will be simpler and cheaper than the fully automatic balancing means and easier and safer than the fully manual balancing means with non automatic blocking means at stopping.

The invention proposes that the balancing means be controlled alternatively, by an automatic device, or manually by the driver (like a motorbike).

More specifically, the invention proposes that the vehicle comprises two means for balancing by inclination of at least the part of its chassis which supports the driver, the first means being manual means for balancing the vehicle by the driver itself like a motorbike and the second means being an automatic means for balancing the vehicle in such a way that it positions the vehicle in vertical position, at low speed and when the vehicle stops, even if the vehicle is not on a horizontal ground.

The vehicle further comprises a switching means which commands the commutation between the two balancing means, and a blocking means for blocking the vehicle in the vertical position when the vehicle stops.

According to the invention, when the vehicle starts, the blocking means is deactivated, the automatic balancing means is activated, if they are not yet activated, until the switching means deactivates this automatic balancing means, and authorizes the manual balancing means by the driver.

When the vehicle slows down, the switching means deactivates the manual balancing means and activates the automatic balancing means.

And when the vehicle stops, the blocking means blocks the vehicle in the vertical position realized (or made) by the automatic balancing means.

The switching means can be a clutch which gears mechanically the automatic means in function with the speed of the vehicle, for example 3 to 6 miles per hour.

The switching means can also be commanded by the information given by a sensor, in particular, the speed, the acceleration or the inclination of the vehicle (or a combination of at least two of these parameters).

According to the invention, other types of sensors can advantageously replace, be associated with, the sensors previously described, for example a sensor for the steering moment of the steering control means, gyroscopes, accelerometers, etc.

According to another characteristic of the preferred embodiments of the invention, the automatic balancing means are also activated when, with the vehicle travelling in conditions in which the information provided by the sensor(s) is higher than the main threshold, this information becomes lower than a descending main threshold, and remains lower than the main threshold. The foregoing information shows that the main threshold is advantageously higher than the descending main threshold.

Advantageously, the vehicle according to the invention also comprises automatic balancing means able to balance the vehicle at the ideal inclination (or close to this ideal inclination) when the vehicle is at not a low speed, before the activation of the switching means. In this case, the switching means which switch from this automatic balancing means to manual balancing means (managed by the driver), permits that the inclination will be at ideal inclination when switching which will be easer for the driver, as the driver has more facility to balance the vehicle in this ideal inclination (or close to this ideal inclination). The ideal inclination occurs when the resultant of the forces applied to the centre of gravity of the inclinable part of the vehicle passes through the longitudinal symmetry axis of the vehicle sustentation polygon, wherein it is well known that the sustentation polygon is described by the individual points of contact points of the different wheels of the vehicle with the ground.

When the inclination is managed by the driver with said manual balancing means, and when the vehicle slows down, said switching means switches said manual balancing means to the said automatic balancing means.

When the vehicle continues to reduce its speed, said automatic balancing means puts the vehicle in vertical position until the vehicle stops, even if the vehicle is not on a horizontal ground.

The vertical level when the stoppage occurs has many advantages. This advantageously prevents any untimely inclination of the vehicle, in particular during parking manoeuvres (carrying out a parking manoeuvre in a gap, for example), or when the vehicle is travelling at a very low speed, for example in order to access a parking space which is narrow and/or surrounded by walls. This therefore guarantees comfortable parking, even on ground which is uneven, or on a slope.

According to the invention, the automatic balancing means positioning to the vertical level (or in a position very close) is advantageously permanently active when the vehicle is reversing.

In addition, according to another characteristic of the invention, the vehicle comprises a manual vertical position switch which, in its active state, commands the automatic balancing means for positioning to the vertical level or to a position close to the vertical level, even if the information which is received from the sensor(s) is higher than the vertical maintenance threshold. This functionality provides the vehicle according to the invention with an additional advantage in terms of driving comfort, in particular in the case in which this vehicle is manoeuvring between other vehicles in traffic, or when it is travelling along a wall, or when it is carrying out parking manoeuvres on a slope. The possibility of using the manual vertical position switch then allows the user of the vehicle according to the invention to force the latter into a dynamic vertical position. The manual vertical position switch could be a press button.

Advantageously, the vehicle comprises means for blocking in its vertical position, or in a position which is very close to the vertical level, when it is at a standstill.

Advantageously, a computer commands the automatic balancing means and the means for blocking the inclination.

According to an advantageous embodiment of the invention, the threshold beyond which the said switching means permit deactivation of the automatic balancing means is slightly higher than the threshold below which the said switching means permit the activation of the automatic balancing mean, when the vehicle slows down.

Advantageously, the said automatic balancing means comprises an automatisation of the manual balancing means, with an actuator, a calculator and the said sensor(s).

According to a variant of the invention, when said automatic balancing means is deactivated, and said manual balancing means is managed by the driver, a part of the energy for balancing is supplied by the actuator to said balancing means, to aid or assist the force which the driver must apply in order to incline or straighten the vehicle, to give said vehicle at the right ideal inclination (or close to the ideal inclination).

These different arrangements, as well as other characteristics and advantages of the invention, will be indicated in the following description.

BRIEF DESCRIPTION OF THE DRAWINGS

FIG. 2 represents a perspective view of the front of a vehicle according to the invention, with two front wheels 3, in a vertical position 10 on a non horizontal ground 9.

DETAILED DESCRIPTION OF EMBODIMENTS

Figure 1:
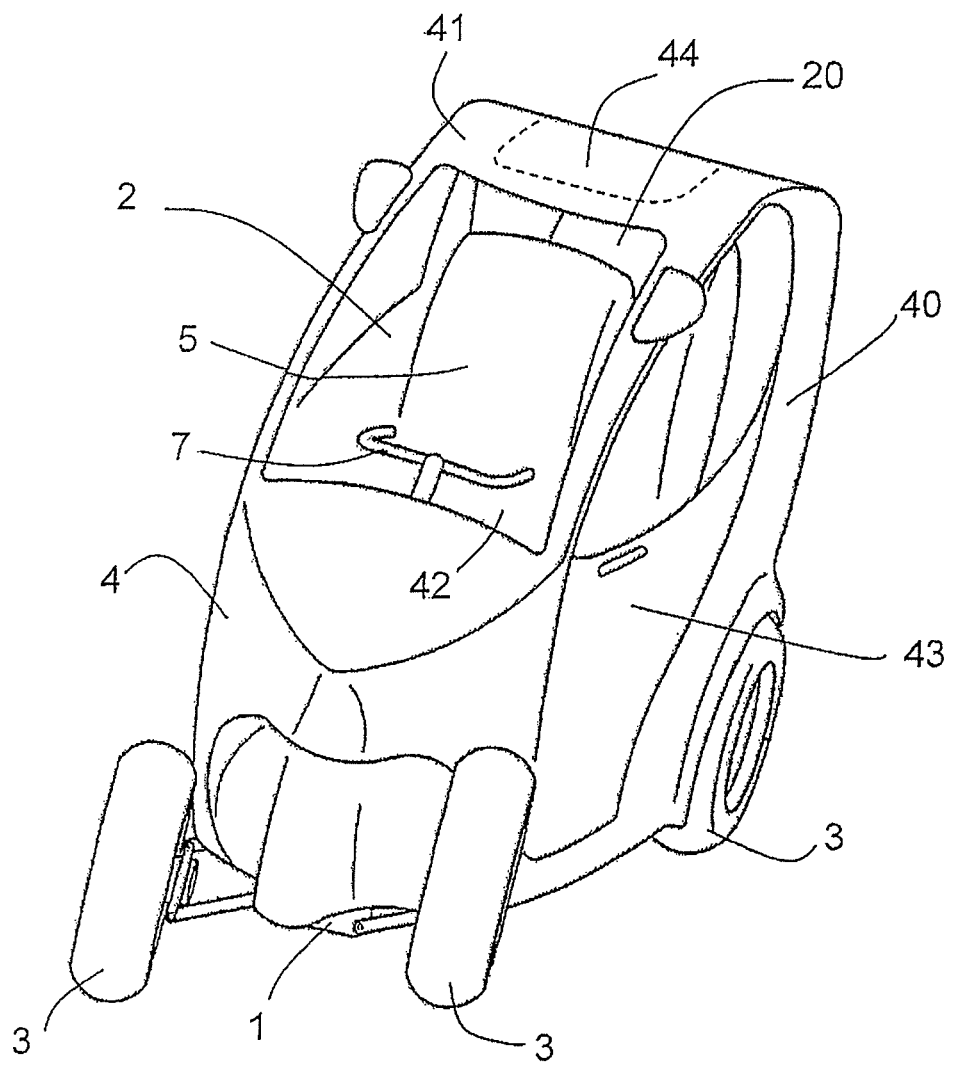
FIG. 1 represents a perspective view of the front of a vehicle according to the invention, with two front wheels.

As illustrated by this FIG. 1, the vehicle according to the invention comprises a chassis 1, two front Wheels 3, which are connected to the chassis. The vehicle according to the invention also comprises a power unit (not represented in FIG. 1), which, by way of non limiting example can be thermal, electrical, hybrid or of any other type.

The driving cab 2 comprises a driver's seat 5, Which is the only seat, the dimensions of the driving cab being such that the vehicle can accommodate only a single person in the Width direction.

According to the embodiment illustrated by FIG. 1, the driving cab 2 is thus closed by a bodywork 4 comprising lateral panels 40, a roof 41, and a front windscreen 42.

According to a characteristic of the invention, a door 43 is provided in each of the lateral panels 40, in order to allow the driver to access the driving cab 2 from either side of the vehicle. The doors 43 can be sliding or pivoting, their direction of opening being defined according to the criteria of accessibility and dimensions of the vehicle. According to different embodiments, these doors can be equipped with transparent panels or windows, such as to increase the visibility for the driver.

According to another characteristic of the vehicle according to the invention, the roof 41 advantageously comprises an opening panel 44. This panel, which according to different embodiments can be sliding according to an axis which is substantially parallel to the longitudinal axis of the vehicle, or pivoting around an axis which is substantially parallel to the said longitudinal axis, or perpendicular to the latter, has two main advantages. Firstly, its opening permits access to the driving cab, and in particular to the area for transporting of objects which is situated at the rear of the vehicle, for example in order to place belongings there. Secondly, in the case in which it is sliding, opening of the panel 44 permits ventilation of the passenger space of the vehicle, as well as easier access in the case when use of the vehicle involves the driver stopping and getting out many times.

In order to drive the vehicle, the driver has a steering unit 7, which in this case is a handlebar according to the embodiment illustrated by FIG. 1.

In order to assure correct road hold, a vehicle of this type comprises balancing means not represented in FIG. 1, which act by simultaneous inclination of the chassis 1 and some or all of the Wheels 3.

FIG. 2 represents a perspective view of the front of a vehicle according to the invention, with two front wheels 3, in a vertical position 10 on a non horizontal ground 9.

As illustrated by this figure, the vehicle according to the invention comprises a part 1 fixed to the chassis (not represented), two front wheels 3, which are connected to part 1 of the chassis.

In the FIG. 2, the balancing means are made by four moving triangles 11 connected at one end to the wheels, and at the other end to the part 1 and another similar part on the front (not represented on the FIG. 2 for the visibility) fixed on the chassis of the vehicle. The rotation is made by the piece 12 which is connected on the left and on the right to the upper end of the two shock absorbers.

The vehicle comprises a series of sensors, in particular for speed, acceleration and/or inclination (not represented in FIG. 2). When the information which is provided by the said sensors (value of a specific parameter, or combination of values of all or some of the parameters measured by the said sensors) is lower than a previously defined main threshold S1, the automatic balancing means are automatically activated.

The vehicle also comprises switching means 15 which can be a clutch. When the information which is provided by the said sensors is higher than the main threshold S1, the clutch deactivates the automatic balancing means and activates the manual balancing means. In a known manner, the automatic balancing means are provided for example by means of an electric motor 14 and a calculator (not represented on the FIG. 2) or by an hydraulic system. The clutch 15 is advantageously an electric clutch if the actuator 14 is an electric motor, but can be a mechanical clutch or a hydraulic switch.

When the clutch 15 has deactivated the motor 14, said balancing means is completely free and it is the driver who needs to command said balancing means to assure the equilibrium of the vehicle.

When the clutch 15 is activated, the motor 14 commands the rotation of the piece 12 to assure, with the help of said calculator and other sensors (not represented on FIG. 2) the equilibrium of the vehicle. This piece 12 pushes the two shock absorbers 13 to incline or straighten the vehicle.

In a simpler embodiment, the said sensors can be replaced by a mechanical device which commands directly (or not directly) said switching means, advantageously with the use of centrifuge force made by the speed of the vehicle, like an automatic clutch of scooters.

Said switching means 15 (clutch) activates said automatic balancing means and deactivates said manual balancing means when, with the vehicle in motion, the information which is provided by the sensor(s) reaches, by decreasing, a main descending threshold S1' which is lower than the main threshold S1, and remains lower than the said main threshold S1.

By way of non-limiting example, when the said sensor which is used to control the switching of the control of the balancing means is a speed sensor, the main threshold S1 can be set to a few miles/hour, for example between 3 and 25 miles/h, and preferably between 3 and 9 miles/h, and for the threshold S1', a value of 1 mile/h less than the threshold S1.

As previously stated, the deactivation of said automatic balancing means makes it possible to limit the power of the electric or hydraulic actuator of the automatic device, and, in particular, to provide a low-power motor (and which therefore has a lower cost and a lower weight).

The vehicle is also provided with a manual vertical position switch (not represented), the actuation of which automatically commands said automatic balancing means to go to the vertical level, irrespective of the value of the information provided by the aforementioned sensor(s).

In the FIG. 2, locking means in the vertical position (or very close to the vertical level) when at a standstill are advantageously made an internal electric brake, directly in said motor 14 itself.

Advantageously, said automatic balancing means comprises an automatisation of said manual balancing means, with an actuator, a calculator and the said sensor(s) like it is represented in FIG. 2, where the actuator 14 is an electric motor.

According to a variant of the invention, when said automatic balancing means is deactivated, and said manual balancing means is managed by the driver, a part of the energy for balancing is supplied by said actuator to the balancing means, to aid or assist the force which the driver must apply in order to incline or straighten the vehicle, to give said vehicle at the right ideal inclination (or close to the ideal inclination In this embodiment, said switching means is not a clutch but it is advantageously an electronic means to switch from automatic balancing manner to an assisted balancing manner.

Said actuator could be hydraulic and realised with hydraulic cylinders.

With reference to the drawings that show a preferred embodiment of a vehicle according to the invention, it has clearly been described a light motorised vehicle, with three wheels or more preferably, wherein two balancing means that proceed by inclination of at least the part of its chassis which supports the driver are comprised of first means which is manual means for balancing the vehicle by the driver itself like a motorbike, and second means which is automatic means for balancing the vehicle in such a way that they position the vehicle in vertical position, at low speed and when the vehicle stops, even if the vehicle is not on a horizontal ground, with said automatic balancing means comprising an actuator to command the moving of the balancing means.

The vehicle further comprises a switching means which commands the commutation between the two balancing means, and a blocking means for blocking the vehicle in the vertical position when the vehicle stops.

The equipment is so constructed as to operate in a way wherein, when the vehicle starts, the said blocking means are deactivated, the said automatic balancing means are activated, if they are not yet activated, until said switching means deactivates the said automatic balancing means, and activates the said manual balancing means, i.e. those balancing means that are operated by the driver, wherein, when the vehicle slows down, said switching means deactivates the said manual balancing means and activates the said automatic balancing means, and wherein, when the vehicle stops, the said blocking means blocks said vehicle in the vertical position obtained by the said automatic balancing means.

The vehicle comprises an optional assistance means for the driver balancing means, and in preferred embodiments the said switching means are so constructed as to be commanded automatically by a mechanical device rather than manually by a vehicle driver.

Preferably the vehicle according to the invention comprises one or more sensors for the speed, the acceleration and/or the inclination of the vehicle, and it is so constructed that the said automatic balancing means is activated firstly, if it is not yet activated, when said vehicle starts, and until the information provided by the said sensor has reached a main threshold, and, secondly when, with the vehicle in motion, the information provided by the said sensor is higher than a main descending threshold, and, whilst decreasing, said information reaches a main descending threshold, the said switching means deactivates said manual balancing means, and activates said automatic balancing means for as long as said information remains lower than said main descending threshold, and until said vehicle stops.

Furthermore, it can advantageously be provided that said automatic balancing means for positioning the vehicle relative to the vertical direction be activated automatically when the vehicle reverses, and/or that the vehicle comprise a manual vertical position switch provided in order to command said automatic balancing means to position vertically said vehicle.

However, the invention cannot be limited to the embodiments and means described in the present document, and it also extends to any other equivalent means and any technically operative combination of such means. In particular, the sensors which provide the information to the switching means are not limited to the sensors for speed, acceleration and/or inclination referred to in the present description. Thus, according to different variants of the invention, it is possible as well to make the thresholds vary according to climatic conditions such as rain, snow or ice, or to be modified by the driver. In addition, although the invention has been described here within the context of its application to a vehicle comprising wheels, it can perfectly be applied as well to a vehicle provided for example with runners for travelling on snow, or to a vehicle the contact of which with the ground is ensured by any type of means appropriate for the surface on which it will run.

We claim:

1. A motorized vehicle with three wheels or more, the motorized vehicle comprising:
    a balancing device configured to set the vehicle in a balanced position, such that the vehicle stands at equilibrium, by moving at least a chassis part thereof,
        wherein the balancing device comprises:
            a manual balancing device that is at the disposition of a driver of the vehicle and that is configured to move the movable chassis part of the vehicle towards equilibrium, and
            an automatic balancing device configured to automatically balance the vehicle such that the vehicle is brought upright in a vertical position, even if the vehicle is not on horizontal ground, when the vehicle is traveling at low speeds or when the vehicle is stopped, the automatic balancing device comprising an actuator that automatically controls the movement of the movable chassis part of the vehicle;
    a switching device configured to transfer between the manual balancing device and the automatic balancing device by alternatively activating either the manual balancing device or the automatic balancing device; and
    a blocking device configured to block the vehicle in the upright vertical position when the vehicle is stopped, the blocking device being deactivated when the vehicle starts running from a resting position so that the automatic balancing device is activated in an operative state of the vehicle until the switching device commands communication and thereby deactivates the automatic balancing device and actives the manual balancing device at the disposition of the driver of the vehicle,
        wherein the switching device is configured to deactivate the manual balancing device and activate the automatic balancing device when the vehicle slows down, and the blocking device is configured to block the vehicle in the upright vertical position set by the automatic balancing device.

2. The motorized vehicle according to claim 1, wherein a mechanical device automatically controls the switching device.

3. The motorized vehicle according to claim 1, further comprising a sensor device configured to provide information based on a current speed, acceleration and/or inclination of the vehicle,
    wherein the automatic balancing device is in an activated state (1) when the vehicle starts running and thus remains in the activated state until the information provided by the sensor device reaches a main threshold value, and (2) when the vehicle is in motion and the information provided by the sensor device is higher than a main descending threshold value,
    whereas when the vehicle is decreasing in speed and the information reaches the main descending threshold value, the switching device deactivates the manual balancing device and activates the automatic balancing device for as long as the information is lower than the main descending threshold value and until the vehicle stops running.

4. The motorized vehicle according to claim 1, wherein the automatic balancing device is configured to move the vehicle to an upright balanced position at an ideal inclination thereof when the vehicle is running at low speed and before the switching device is activated to transfer between the manual balancing device and the automatic balancing device, the ideal inclination being such that a resultant of forces applied to the centre of gravity of an inclinable part of the vehicle passes through a longitudinal symmetry axis of a sustentation polygon of the vehicle.

5. The motorized vehicle according to claim 1, further comprising an assistance device configured to assist the driver of the vehicle when operating the manual balancing device.

6. The motorized vehicle according to claim 1, further comprising an activation device configured to automatically activate the automatic balancing device when the vehicle is in reverse so that the automatic balancing device positions the vehicle back to the upright vertical position.

7. A vehicle according to claim 1, further comprising a manual vertical position switch configured to command the automatic balancing device to position the vehicle vertically.

* * * * *